United States Patent [19]

Pellow et al.

[11] 4,411,594
[45] Oct. 25, 1983

[54] SUPPORT MEMBER AND A COMPONENT SUPPORTED THEREBY

[75] Inventors: Terence R. Pellow, Watford; Derek A. Glew, Alveston, both of England

[73] Assignee: Rolls-Royce Limited, London, England

[21] Appl. No.: 390,930

[22] Filed: Jun. 22, 1982

Related U.S. Application Data

[63] Continuation-in-part of Ser. No. 151,886, May 20, 1980, abandoned.

[30] Foreign Application Priority Data

Jun. 30, 1979 [GB] United Kingdom ............... 7922802
Apr. 28, 1980 [GB] United Kingdom ............... 8013985

[51] Int. Cl.³ ............................................ F01D 11/08
[52] U.S. Cl. ............................ 415/174; 415/170 R; 277/53
[58] Field of Search ............ 415/127, 128, 136, 138, 415/172 A, 173 R, 174, 197, 113; 277/53, 95

[56] References Cited

U.S. PATENT DOCUMENTS

| Re. 30,206 | 2/1980 | Ferguson et al. | 415/174 |
|---|---|---|---|
| Re. 30,600 | 5/1981 | Long et al. | 415/174 X |
| 930,908 | 8/1909 | Westinghouse | 415/136 |
| 2,427,244 | 9/1947 | Warner | 415/136 |
| 2,494,178 | 1/1950 | Imbert | 415/136 |
| 2,878,048 | 3/1959 | Peterson | 277/53 |
| 2,927,724 | 3/1960 | Wardle | 415/113 |
| 3,117,716 | 1/1964 | Wernicke | 415/136 |
| 3,146,992 | 9/1964 | Farrell | 415/136 X |
| 3,529,905 | 9/1970 | Meginnis | 415/174 X |
| 3,807,891 | 4/1974 | McDow et al. | |
| 3,836,279 | 9/1974 | Lee . | |
| 3,867,065 | 2/1975 | Schaller et al. | 415/217 X |
| 3,887,299 | 6/1975 | Profant | 415/174 |
| 3,966,353 | 6/1976 | Booher, Jr. et al. | 415/217 |
| 3,966,356 | 6/1976 | Irwin | 415/174 X |
| 3,981,609 | 9/1976 | Koenig . | |
| 4,053,254 | 8/1977 | Chaplin et al. | 415/178 X |
| 4,060,250 | 11/1977 | Davis et al. . | |
| 4,087,199 | 5/1978 | Hemsworth et al. | 415/174 |
| 4,103,905 | 8/1978 | Desmond et al. | 415/113 X |
| 4,202,554 | 5/1980 | Snell | 277/53 |
| 4,247,247 | 1/1981 | Thebert | 415/113 |
| 4,281,838 | 8/1981 | Persson | 277/53 |
| 4,358,120 | 11/1982 | Moore | 277/53 |

FOREIGN PATENT DOCUMENTS 1363897 8/1974 United Kingdom ............... 415/136

Primary Examiner—Philip R. Coe
Assistant Examiner—Frankie L. Stinson
Attorney, Agent, or Firm—Cushman, Darby & Cushman

[57] ABSTRACT

A turbine suitable for a gas turbine engine is provided with a stage of rotary aerofoil blades which is surrounded by a shroud ring made of silicon nitride. In order to minimize load transfer between the shroud ring and the turbine casing the shroud ring is radially supported by and radially spaced apart from the turbine casing by an annular brush seal.

14 Claims, 4 Drawing Figures

SUPPORT MEMBER AND A COMPONENT SUPPORTED THEREBY

This application is a continuation-in-part application of Ser. No. 151,886, filed May 20, 1980, and now abandoned.

This invention relates to a structure comprising a support member and a component supported thereby.

It has long been a problem to support components which are subject to thermal expansion and contraction with support members which are also subject to such thermal expansion and contraction but at a different rate. If the two are rigidly connected, each will be subject to stresses which may eventually lead to their mechanical failure. This is particularly so in the case when either or both of the support member and component are made from a brittle material such as a ceramic.

This is a problem which can arise in gas turbine engines and in particular in the combustion and turbine regions of such engines.

Turbines suitable for gas turbine engines conventionally comprise a casing enclosing alternate stages of rotary and stationary aerofoil blades positioned in an annular gas passage. In order to ensure the efficient operation of such turbines, it is important that the clearances between the tips of the rotary aerofoil blades and the radially outer wall of the gas passage are as small as possible. If the clearances are too great, excessive gas leakage occurs across the blade tips, thereby reducing turbine efficiency. There is a danger however that if clearances are reduced so as to reduce leakage, it is likely that under certain turbine operating conditions, the tips of the rotary blades will make contact with the gas passage wall, thereby causing both blade and wall damage.

In an attempt to ensure that optimum blade tip clearances are achieved and maintained with minimal gas leakage across them, it has been suggested to surround a stage of rotary aerofoil blades with a shroud ring. The shroud ring is conventionally attached to the turbine casing in such a manner that it provides a radially inner surface which defines a portion of the radially outer wall of the turbine annular gas passage. Since the shroud ring is an item which is comparatively simple to manufacture, it may be closely toleranced so as to ensure that rotary aerofoil blade tip clearances are as near to the optimum as is possible. However, shroud rings still present problems in ensuring that optimum tip clearances are maintained during turbine operation. These problems are associated mainly with the differing rates of thermal expansion of the turbine casing, the shroud ring and the rotary aerofoil blade assembly. Thus, for instance, although the turbine casing and shroud ring may be formed from materials having the same or similar rates of thermal expansion, the difference in their masses and the temperatures to which they are exposed during turbine operation ensures that they usually expand and contract at different rates. Consequently there is a danger of the shroud ring and possibly the turbine casing being distorted. Similarly the shroud ring and rotary aerofoil blade stage are likely to radially expand and contract at differing rates, thereby causing variations in the tip clearances of the rotary aerofoil blades.

U.S. Pat. No. 3,807,891 of Mc Dow describes a shroud ring for the turbine of a gas turbine engine which is provided with rigid fingers which directly attach the shroud ring to the turbine casing in such a manner as to transfer a load from the casing through the fingers to the shroud during turbine operation. If such a method of direct attachment is used with a shroud ring which is formed from a brittle material such as a ceramic, there is a danger that the loads imposed upon the shroud ring by the fingers will cause the shroud ring to fracture.

It is an object of the present invention to provide a structure comprising a support member and a component supported thereby in which loadings between them are minimised.

It is a further object of the present invention to provide a turbine which includes a turbine casing, shroud ring and rotary aerofoil blade stage which is so adapted as to minimise variations in the clearances between the tips of the rotary aerofoil blades and the shroud ring during turbine operation.

In accordance with the present invention, a structure comprises:

an annular support member;

an annular component, said annular support member surrounding said annular component and said annular component being capable of floating radially relative to said support member; and sealing means resiliently supporting said annular component from said support member in spaced relationship therewith while permitting said annular component to have independent floating radial movement relative to said annular support member without any significant load transfer therebetween, said sealing means including an array of upstanding filaments having fixed ends and free ends, said fixed ends of said array of upstanding resilient filaments being fixed to one of said annular support member and said annular component and the free ends of said annular array of filaments engaging the other of said annular support member and said annular component, said array of upstanding resilient filaments defining a brush seal between said annular support member and said annular component.

In accordance with a further aspect of the present invention, a turbine suitable for a gas turbine engine comprises:

an annular gas passage having a radially outer wall;

a turbine casing having a first wall portion thereof defining a portion of said radially outer wall of said gas passage and another wall portion spaced radially outwardly of said first wall portion;

a stage of rotary aerofoil blades positioned within said annular gas passage and having an axis of rotation;

a shroud ring positioned radially inwardly of said another wall portion of said turbine casing and surrounding and spaced from said aerofoil blades, said shroud ring being capable of floating radially with respect to the axis of rotation and defining another portion of the radially outer wall of said annular gas passage and having at least a portion thereof made of a ceramic material, and said shroud ring and said another wall portion of said turbine casing spaced radially outwardly thereof defining an annular chamber having a radially outer wall and a radially inner wall; and sealing means resiliently supporting said shroud ring in radially spaced apart relationship from another wall portion of said turbine casing while permitting independent floating radial movement relative to said turbine casing, said sealing means including an annular array of upstanding resilient filaments mounted on said another wall portion of said turbine casing and having free ends engaging said shroud ring, said annular array of upstanding filaments defining an annular brush seal between said turbine casing and said shroud ring and supporting said shroud ring for floating radial movement with respect to said axis of rotation without any significant load transfer between said shroud ring and another wall portion of said turbine casing.

Annular brush seals are known in the art and conventionally comprise an annular array of upstanding generally radially extending resilient filaments which are anchored at either of their radially inner or outer ends by a support member. The free ends of the filaments engage the peripheral surface of a member so that a seal is provided between the peripheral surface of the member and the filament support.

The upstanding filaments may be anchored by clamping or alternatively by constituting part of a woven structure such as a velvet-like fabric.

Since the shroud ring is radially supported from and radially spaced apart from the turbine casing by a brush seal comprising a plurality of resilient filaments, it is free to move relative to the casing over a restricted range without the seal between the casing and shroud ring being broken. In particular the shroud ring and casing may expand or contract at differing rates without the seal between them being broken and also without any significant load transfer taking place between them.

The lack of any significant load transfer between the shroud ring and casing under a large range of thermal conditions means that the shroud ring may comprise a ceramic material which, under normal circumstances would not tolerate direct attachment to the casing. Since ceramics generally have low rates of thermal expansion, the use of a shroud ring which comprises a ceramic material is highly advantageous in the maintenance of small blade tip clearances which vary little during turbine operation. Thus whilst the rotary aerofoil blade stage may expand and contract radially during turbine operation, the tip clearances between the rotary aerofoil blades and shroud ring vary over a smaller range than is the case when conventional metallic shroud rings are utilised. The invention will now be described by way of example with reference to the accompanying drawings in which:-

Figure 1:
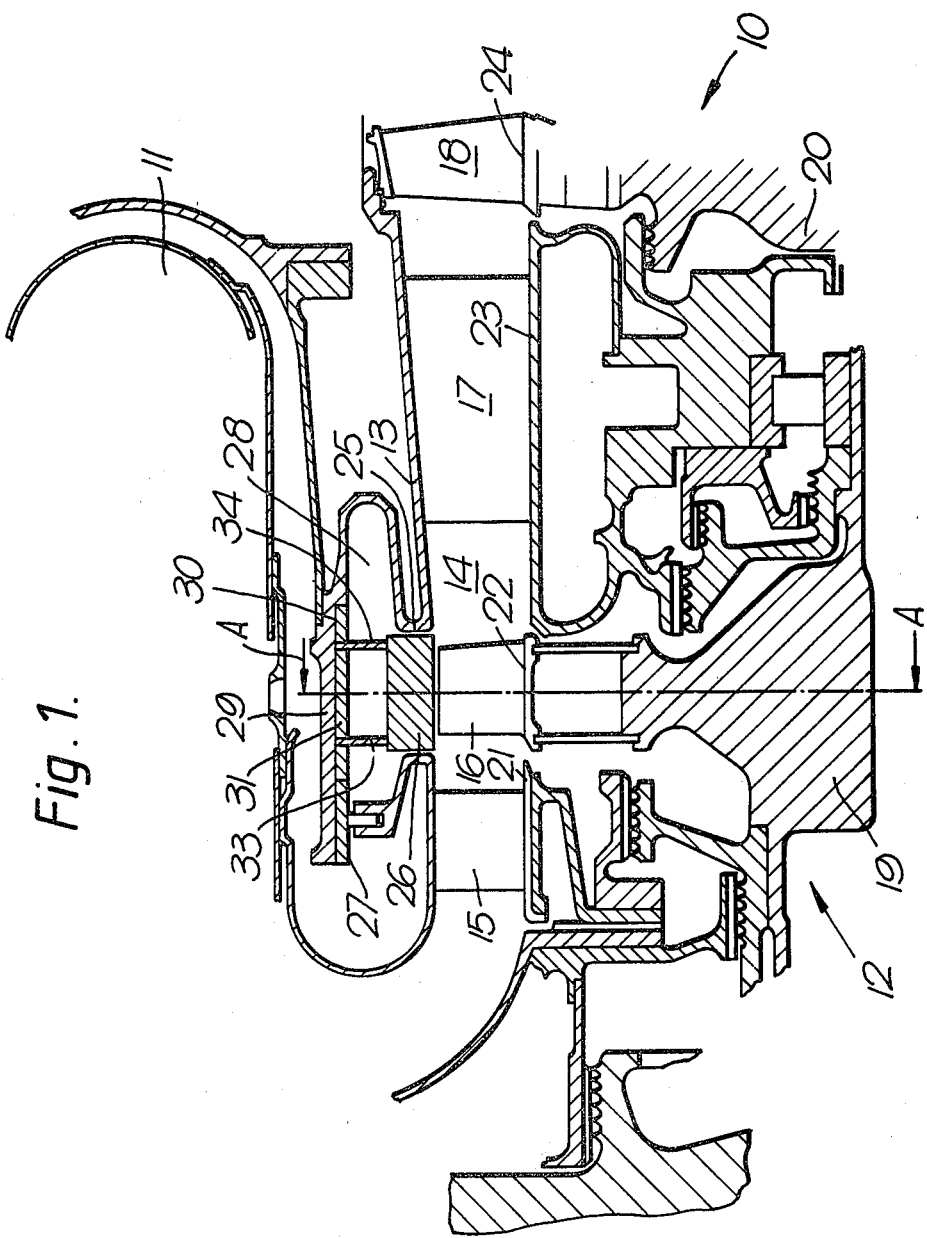
FIG. 1 is a sectioned side view of a portion of a gas turbine engine incorporating a turbine in accordance with the present invention.

With reference to FIG. 1 a gas turbine engine portion generally indicated at 10 comprises a combustion chamber 11 and a turbine 12. The turbine 12 in turn comprises a casing 13 which defines the radially outer wall of an annular gas passage 14. The passage 14 contains, in flow series, stages of stationary nozzle guide vanes 15, rotary high pressue aerofoil blades 16, low pressure stator vanes 17 and rotary low pressure aerofoil blades 18. The stages of rotary aerofoil blades 16 and 18 are mounted for rotation on discs 19 and 20 respectively. The nozzle guide vanes 15 and rotary aerofoil blades 16 constitute the high pressure section of the turbine 10 and the stator vanes 17 and rotary aerofoil blades 18 the low pressure section. The platforms 21, 22, 23 and 24 of the nozzle guide vanes 15, rotary aerofoil blades 16, stator vanes 17 and rotary aerofoil blades 18 respectively define the radially inner wall of the gas passage 14.

The turbine casing 13 is axially divided radially outwardly of the rotary high pressure aerofoil blade array 16 to provide a circumferentially extending housing 25 for a silicon nitride shroud ring 26. The housing 25 is of sufficient axial length to provide sufficient clearance for the shroud ring 26 to float radially with respect to the axis of rotation of the turbine 10. The walls of the housing 25 extend radially outwardly to cooperate with a generally T-shaped cross-section ring 27 so that together they define an annular chamber 28. The radially outer wall 29 of the chamber 28 is provided with a recess 30 which accommodates a support ring 31 carrying two annular arrays of upstanding generally radially inwardly extending nickel base alloy filaments 33 and 34. The free ends of the filaments 33 and 34 engage and support the radially outer surface of the shroud ring 26 so that the shroud ring 26 is radially spaced apart from the turbine casing 13 but is located axially by the walls of the housing 25. Thus the filaments 33 and 34 and support ring 31 constitute a brush seal which provides the sole radial support for the shroud ring 26.

Figure 2:
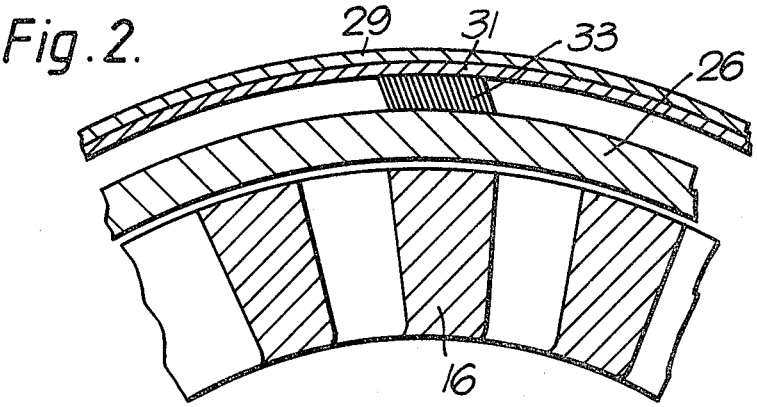
FIG. 2 is a view on section line A-A of FIG. 1.

The filaments 33 whilst being generally radially extending, are inclined to the radii of the shroud ring 26 as can be seen in FIG. 2. The filaments 34 are also inclined to the radii of the shroud ring 26 but in the opposite direction. Thus together the filaments 33 and 34 oppose any tendency for the shroud ring 26 to rotate in either a clockwise or anti-clockwise direction.

The filaments 33 and 34 serve a dual role. They firstly support the shroud ring 26 from the turbine casing 13 in such a manner that any radial growth or contraction of the turbine casing 13 due to thermal expansion or contraction is not transmitted to the shroud ring 26. Thus any alterations in the radial distance between the turbine casing 13 and the shroud ring 26 arising from relative radial expansion or contraction results in the filaments 33 and 34 flexing in the manner of springs so as to accommodate those alterations. Consequently little load transfer occurs between the turbine casing 13 and the shroud ring 26, thereby permitting the shroud ring 26 to be formed from a brittle material such as silicon nitride. It will be appreciated, however, that the present invention is generally applicable to shroud rings comprising any convenient ceramic material.

The filaments 33 are each 0.003 inches diameter and are so packed together that there is a density of from 2250 to 2650 filaments per inch of circumference of the support ring 31. In the cold state, the filaments are deflected, in the radial sense, by approximately 0.02 inches. This results in the filaments 31 exerting a load of approximately 0.154 pounds per square inch on the shroud ring 26. At normal turbine operating temperature, the loading exerted upon the shroud ring 26 reduces to little more than zero.

Since ceramics in general and silicon nitride in particular have low coefficients of thermal expansion, they can be expected to dimensionally alter very little during turbine operation. It follows from this that during turbine operation, the clearance between the tips of the rotary aerofoil blades 16 and the shroud ring 26 effectively only vary by the amount that the blades 16 and their associated disc 19 thermally expand and contract in a radial direction. Thus tip clearances are unaffected by the amount that the turbine casing 13 may thermally expand or contract during turbine operation.

The second role served by the filaments 33 and 34 is in providing an axial gas seal across the shroud ring 26. Thus during the operation of the turbine 12 some of the hot exhaust gases directed by the stage of nozzle guide vanes 15 onto the stage of rotary aerofoil blades 16 escape through the housing 25 and into the annular chamber 28. The filaments 33 and 34 prevent these gases from passing across the annular chamber 28 and re-entering the annular gas passage downstream of the rotary aerofoil blade stage 16. Consequently the only gas leakage across the rotary aerofoil blade stage 16 is across the blade tips.

Figure 3:
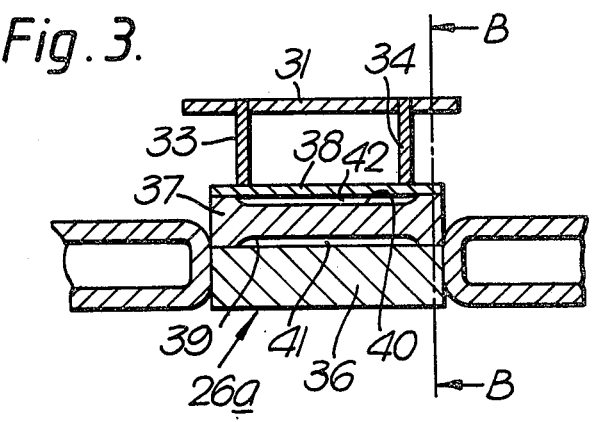
FIG. 3 is a sectioned side view of an alternative form of the present invention.
Figure 4:
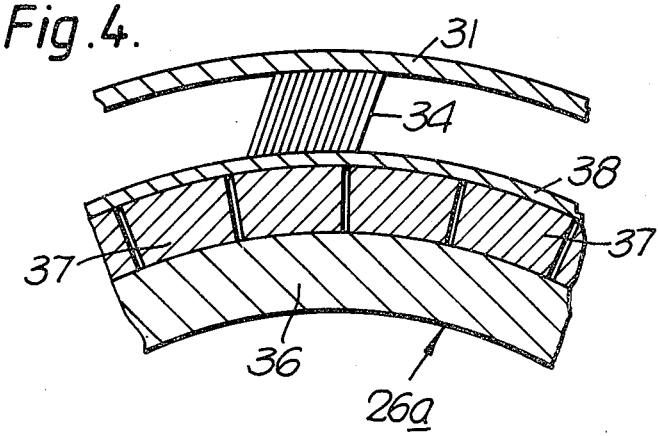
FIG. 4 is a view on section line B-B of FIG. 3.

In certain instances, the temperatures which are encountered in a gas turbine engine turbine are so high that the silicon nitride heats up to such an extent that the filaments 33 and 34 may be in danger of heat damage. In such circumstances it is preferred to utilise a shroud ring which has improved heat insulation properties. Such a shroud ring 26a is shown in FIGS. 3 and 4.

The shroud ring 26a comprises a silicon nitride ring portion 36 which is similar to the previously described shroud ring 26. However the radially outer surface of the silicon nitride ring portion 36 is provided with an annular array of ceramic blocks 37. The annular array of ceramic blocks 37 is surrounded in turn by a metallic ring-shaped support member 38 which serves to retain the ceramic blocks 37 in position around the silicon nitride ring portion 36.

The ceramic blocks 37 are provided with cut-out portions 39 and 40 on their radially inner and outer surfaces respectively. These cut-out portions 39 and 40 cooperate with the silicon carbide ring portion 36 and the ring shaped support member 38 respectively to define insulating air gaps 41 and 42. Thus the air gaps 41 and 42 together with the ceramic blocks 37 ensure that the filaments 33 and 34 do not overheat.

Although the present invention has been described with reference to the high pressure stage of a turbine, it will be appreciated that the invention is in fact applicable to any turbine stage.

It will also be appreciated that whilst the present invention has been described with reference to the mounting of a shroud ring within the turbine of a gas turbine engine, it does have broader applications. Thus in its broadest aspect, the present invention relates generally to the mounting of circular cross-section components by means of an array of upstanding filaments which are so arranged as to define a brush seal. Moreover the array of upstanding filaments could be mounted in a support member or alternatively on the component itself so that the free ends of the upstanding filaments engage the support member.

We claim:
1. A structure comprising;
an annular support member;
an annular component, said annular support member surrounding said annular component, and said annular component being continuous and being capable of floating radially relative to said support member; and
sealing means resiliently supporting said annular component from said support member in spaced relationship therewith while permitting said annular component to have independent floating radial movement relative to said annular support member without any significant load transfer therebetween, said sealing means including an array of upstanding resilient filaments having fixed ends and free ends, said fixed ends of said array of upstanding resilient filaments being fixed to one of said annular support member and said annular component and the free ends of said annular array of filaments engaging the other of said annular support member and said annular component, said array of upstanding resilient filaments defining a brush seal between said annular support member and said annular component.

2. A structure as claimed in claim 1 wherein said annular support member has an annular radially inwardly facing surface and wherein the fixed ends of said upstanding resilient filaments of said annular array are mounted on the annular radially inwardly facing surface of sdaid annular support member with the free ends of said upstanding resilient filaments of said annular array engaging said annular component.

3. A structure as claimed in claim 2 wherein said annular support member has an annular radially inwardly facing surface and wherein the fixed ends of said upstanding resilient filaments of said annular array are mounted on the annular radially inwardly facing surface of said annular support member with the free ends of said upstanding resilienbt filaments of said annular array engaging said annular component.

4. A turbine suitable for a gas turbine engine comprising:
an annular gas passage having a radially outer wall;
a turbine casing having a first wall portion thereof defining a portion of said radially outer wall of said gas passage and another wall portion spaced radially outwardly of said first wall portion;
a stage of rotary aerofoil blades positioned within said annular gas passage and having an axis of rotation;
a shroud ring positioned radially inwardly of said another wall portion of said turbine casing and surrounding and spaced from said aerofoil blades, said shroud ring being continuous and being capable of floating radially with respect to the axis of rotation and defining another portion of the radially outer wall of said annular gas passage and having at least a portion thereof made of a ceramic material, and said shroud ring and said another wall portion of said turbine casing spaced radially outwardly thereof defining an annular chamber having a radially outer wall and a radially inner wall; and
sealing means resiliently supporting said shroud ring in radially spaced apart relationship from said another wall portion of said turbine casing while permitting independent floating radial movement relative to said turbine casing, said sealing means including an annular array of upstanding resilient filaments mounted on said another wall portion of said turbine casing and having free ends engaging said shroud ring, said annular array of upstanding filaments defining an annular brush seal between said trubine casing and said shroud ring and supporting said shroud ring for floating radial movement with respect to said axis of rotation without any significant load transfer between said shroud ring and said another wall portion of said turbine casing.

5. A turbine suitable for a gas turbine engine as claimed in claim 4 wherein said turbine casing is axially divided radially outwardly of said rotary aerofoil blade stage so as to define a circumferentially extending housing including said another wall portion for accommodating said shroud ring and defining therewith the annular chamber radially outwardly of said shroud ring, said annular chamber having the radially outer wall defined by said housing and the radially inner wall defined by the outer surface of said shroud ring, said annular brush seal being located within said annular chamber between the radially outer wall of said chamber and the radially outer surface of said shroud ring.

6. A turbine suitable for a gas turbine engine as claimed in claim 4 wherein said shroud ring comprises a ring-shaped support member carrying the at least ceramic portion of the shroud ring, said at least ceramic portion of the shroud ring being a silicon nitride portion, said ring-shaped support member being engaged by the free ends of the upstanding resilient filaments of the annular brush seal.

7. A turbine suitable for a gas turbine engine as claimed in claim 4 wherein said annular brush seal comprises a support member carrying at least one annular array of upstanding filaments which are inclined to the radii of said shroud ring.

8. A turbine suitable for a gas turbine engine as claimed in claim 7 wherein said annular brush seal comprises two or more annular arrays of filaments which are coaxially mounted, axially spaced apart and carried by a common support member.

9. A turbine suitable for a gas turbine engine as claimed in claim 8 wherein the filaments of ech annular array are inclined to the radii of said shroud ring in a direction which is opposite to that of the filaments of its adjacent array.

10. A turbine suuitable for a gas turbine engine as claimed in claim 7 wherein the support member carrying the annular array of filaments is mounted on the radially outer wall of said annular chamber defined by said turbine casing so that the free ends of said filaments engage and support said shroud ring.

11. A turbine suitable for a gas turbine engine as claimed in claim 4 wherein said annular brush seal filaments are formed from a nickel base alloy.

12. A turbine suitable for a gas turbine engine as claimed in claim 4 wherein said shroud ring comprises an annular silicon nitride portion.

13. A turbine suitable for a gas turbine engine as claimed in claim 12 wherein said shroud ring additionally comprises a further ceramic material interposed between said silicon nitride portion and said ring shaped support member.

14. A turbine suitable for a gas turbine engine as claimed in claim, 13 wherein said further ceramic material is so adapted that insulating air gaps are defined between said further ceramic material and each of said silicon nitride portion and said ring-shaped support member.

* * * * *